`2,999,862`
PROCESS FOR CONVERTING CRUDE COPPER PHTHALOCYANINE INTO FINELY DIVIDED β-FORM
Georg Geiger, Binningen, Switzerland, assignor to Sandoz Ltd., Basel, Switzerland, a Swiss firm
No Drawing. Filed Aug. 14, 1959, Ser. No. 833,699
Claims priority, application Switzerland Aug. 15, 1958
5 Claims. (Cl. 260—314.5)

It is known that crude phthalocyanine can be converted into finely divided form by dry grinding in presence of solid grinding assistants. It is also known that when the grinding process is carried out at high temperatures, i.e. between 80° and 150° C., the product is obtained in the β-form which is highly valued on account of its greenish shade and its stability to organic solvents.

The same β-modification is obtained when the grinding operation is performed with sodium chloride or other salts at room temperature and in the presence of certain specified organic solvents (cf. U.S.P. 2,556,728).

Further, it is known that the solvent-stable β-form results when copper phthalocyanine is ground at room temperature in absence of sodium chloride but in presence of a substantial volume of an organic solvent, a process which however entirely excludes the use of water (cf. U.S.P. 2,556,726).

It has now been found that when grinding is carried out in presence of water at elevated temperature, preferably between 40° and 200° C., a similar pigment dyestuff is obtained with greater economy due to the omission of a solid grinding assistant. The weight of water used may amount to 3 to 50 times that of the crude phthalocyanine, but an amount 10 to 15 times that of the product is preferable.

After grinding, the copper phthalocyanine is filtered off and the filter cake washed with water and dried.

The β-form is obtained in partial yield already at 20° C., being recognizable by its marked shift in color to green in comparison with the pure α-form produced by reprecipitation from sulfuric acid. With increasing grinding temperature the color of the pigment dyestuff exhibits an increasingly pronounced shift toward greenish-blue, until at about 90° C. its color is practically that of the pure β-form. In the same way as the color changes from reddish-blue to greenish-blue with increasing temperature so the stability to solvents increases. This can be quickly and easily determined by heating the resulting pigment dyestuff in toluene for 15 minutes at 90–95° C. The higher the grinding temperature, i.e. the greater the proportion of the β-form, the smaller are the crystals formed on heating in this solvent. The pure α-form yield crystals with a fairly uniform length of about 15μ, while the pure β-form remains unchanged. Even when ground at 20° C. the crystalline state can just be recognized when the pigment dyestuff is heated in toluene and viewed in an ordinary light microscope. When ground at 20° C. and used for coloring nitrocellulose lacquer, the pigment dyestuff undergoes a pronounced color change to green during storage, but this is no longer the case when it is ground at temperatures above 60–80° C.

The pigment dyestuff obtained according to the process herein disclosed is suitable for the mass coloration of paper, plastics, artificial fibers, synthetic resins, and cement, for printing textiles and paper, and for coloring oil paints, lacquers and printing inks. Thanks to its stability to solvents it can be used for the pigmentation of nitrocellulose lacquers which contain aromatic solvents.

In the following examples the parts and percentages are by weight and the temperature in degrees centigrade.

*Example 1*

In a ball mill of 500 parts by volume capacity, 17 parts of crude copper phthalocyanine and 200 parts of water are ground at 95° by the action of 1000 parts of 3-millimeter diameter steel balls, until no further appreciable increase in color strength can be achieved. The grinding time is approximately 40 hours. The resulting suspension is separated from the steel balls acidified with 30 parts of concentrated hydrochloric acid and stirred in a flask for 30 minutes at 80–90° in order to dissolve anyrubbed-off iron particles which may be present. It is then filtered off, washed with water and dried to give a bright blue pigment dyestuff.

A nitrocellulose coating is prepared as follows: 1 part of the above pigment dyestuff, 2 parts of titanium dioxide, 15 parts of nitrocellulose, 20 parts of a 60% solution of a non-drying alkyd resin in toluene and 3 parts of tricresyl phosphate are ground for 24 hours in a ball mill. In order to obtain a sprayable lacquer the thick blue mass is diluted in the ratio of 1:10 with a solvent mixture consisting of 100 parts of toluene, 40 parts of methylisobutyl ketone, 20 parts of butyl acetate, 20 parts of butyl alcohol, 16 parts of ethyl acetate and 4 parts of ethyl lactate.

The colored lacquer is sprayed on an aluminum foil to give a coating of several μ thickness and then air dried. A bright blue nitrocellulose coating with good fastness properties to light, washing and weathering is obtained.

*Example 2*

When 17 parts of crude copper phthalocyanine and 200 parts of water, as specified in the above example, are ground in a ball mill for approximately 40 hours at 65°, a slightly redder pigment dyestuff is obtained which is completely stable in toluene.

*Example 3*

In a ball mill of 3000 parts by volume capacity 30 parts of crude copper phthalocyanine and 1000 parts of water are ground in presence of 7000 parts of 3-millimeter diameter steel balls at 130–135° until it is found that the color strength of a processed sample cannot be increased by continued grinding. This takes about 20 hours to accomplish. The contents of the mill are allowed to cool to 80–90° and the steel balls sieved off. 50 parts of concentrated hydrochloric acid are added and the product stirred for 30 minutes at 80–90° to dissolve any iron particles abraded during grinding. It is then filtered off, washed until neutral, and dried. The blue pigment dyestuff obtained has the shade of β-copper phthalocyanine and is of high color strength.

A linseed oil paint is prepared as follows:

20 parts of zinc white, 18 parts of boiled linseed oil and 0.2 part of the above-described dyestuff are ground together in a Hoover automatic miller over 400 revolutions. After every 100 revolutions the resulting paste is scraped off the two glass plates with spatula and deposited at the center of the rotating plate. When ground to the desired consistency, a suitable siccative is mixed with the paste by hand. The finished paste is applied to good-quality type writer paper (so-called India paper) with a spatula at a thickness sufficient to cover the white ground. A blue linseed oil coating is obtained.

*Example 4*

When the 30 parts of copper phthalocyanine and 1000 parts of water are ground in a ball mill for 20 hours at 105°, a blue pigment dyestuff with the shade of β-copper phthalocyanine and of equally high color strength is obtained.

Example 5

When the 30 parts of copper phthalocyanine and 1000 parts of water are ground in a ball mill for 20 hours at 170°, a blue pigment dyestuff with equally good color strength is obtained.

Example 6

100 parts of copper phthalocyanine and 1000 parts of water are ground in a ball mill of 3000 parts by volume capacity with 7000 parts of steel balls of 3-millimeter diameter at room temperature until the color strength of a processed sample cannot be increased by further grinding. About 60 hours are necessary to obtain this result. The contents of the mill are sieved free of the steel balls and stirred for 30 minutes at 80–90° with the addition of 100 parts of concentrated hydrochloric acid to dissolve any rubbed-off iron particles which may be present. It is then filtered, washed until neutral, and dried. The resulting blue pigment dyestuff is of high color strength and has a slightly more reddish shade than the pure β-copper phthalocyanine, and it possesses only limited stability to solvents in nitrocellulose lacquers.

Having thus disclosed the invention what I claim is:

1. A process for the conversion of crude reddish-blue copper phthalocyanine into the finely divided greenish-blue β-form having improved tinctorial strength, which consists in grinding dry crude reddish-blue copper phthalocyanine at elevated temperature in a ball mill in the presence of water as the exclusive grinding assistant and recovering the finely divided greenish-blue β-form.

2. A process according to claim 1 in which the conversion is carried out at temperatures ranging from 40° to 200° C.

3. A process according to claim 1 in which the conversion is carried out at temperatures ranging from 80° C. to 110° C.

4. A process according to claim 1 in which the amount of water present is from about 3 to 50 times the weight of the crude phthalocyanine.

5. A process according to claim 1, in which the amount of water present is from about 10 to 15 times the weight of the crude phthalocyanine.

References Cited in the file of this patent

UNITED STATES PATENTS

| | | |
|---|---|---|
| 2,556,728 | Graham | June 12, 1951 |
| 2,891,964 | Roberts | June 23, 1959 |
| 2,900,390 | Brouillard et al. | Aug. 18, 1959 |
| 2,908,690 | Cooper | Oct. 13, 1959 |